Feb. 9, 1965 W. WAGNER 3,168,831

ACCELEROMETER OR DECELEROMETER

Filed Jan. 2, 1962 2 Sheets-Sheet 1

INVENTOR
William Wagner
BY Samuel J. Stoll
ATTORNEY

ACCELEROMETER OR DECELEROMETER

Filed Jan. 2, 1962 2 Sheets-Sheet 2

INVENTOR
William Wagner
BY
Samuel J. Stee
ATTORNEY

United States Patent Office 3,168,831

Patented Feb. 9, 1965

3,168,831

ACCELEROMETER OR DECELEROMETER

William Wagner, North Miami Beach, Fla., assignor to Watsco, Inc., Hialeah, Fla.

Filed Jan. 2, 1962, Ser. No. 163,476
1 Claim. (Cl. 73—492)

This invention relates to devices for measuring the acceleration and deceleration of motor vehicles.

Generally, the object of the invention is to provide a novel, simple, and inexpensive device for testing the positive and negative rates of change of velocity of a motor vehicle, such as an automobile or truck. More specifically, the invention contemplates such a device for testing the pick-up and the efficiency of the brakes of an automobile or truck.

A particular object of the invention is to provide such a device adapted to be affixed to a convenient vertical part of the side of an automobile or truck, and preferably to the inside of the glass pane of the window to one side or the other of the driver's seat of such a vehicle, whereby the driver may readily observe the device in operation without moving from his seat.

Another object is to provide a device of the class described which comprises a main frame of light laminate construction, such as a sandwich structure made of a planar sheet of cardboard and one or more sheets of plastic, with at least one thereof having two permanently bent portions adapted to form, with the first-mentioned sheet, two blisters, one being part of a level to facilitate proper mounting and orientation of the device, and the other being, when the device is properly oriented, an inclined runway for a freely rollable and captive ball and having a downwardly directed portion at the upper end of the runway for receiving and holding the ball when speed change of the vehicle has caused the ball to roll all the way to the top of the runway.

Another object is to provide such a device, as last described, with at least one outer lamina thereof planar in shape, and adapted to be fixed, as by adhesive, in a particular orientation, to the inside of the window pane to the left or the right of the driver of a motor vehicle. Such adhesive may, within the scope hereof, be applied during manufacture of the device, to parts of, or to all of, the outer surface of one outer planar lamina, and may be of any type suitable for use with glass—such as a pressure-sensitive resinous adhesive or an adhesive made effective by moisturization and oxidation.

The invention also contemplates a device of the class described in combination with a properly oriented pouch adapted to be affixed to the inside of a window pane of a motor vehcle, the device being freely removable from such pouch.

Another object is to provide a device of the general class described first above which comprises a main frame, such as a relatively thick flat sheet of suitable material, having two fenestrations therethrough, one thereof adapted to receive a sealed straight transparent tube containing liquid and an air bubble—these elements constituting a level—and the other fenestration adapted to receive an elongated transparent tube the greater portion of which is straight and inclined with respect to the longitudinal axis of the level, the upper end portion of the tube being bent downward, and the tube containing a ball free to roll therein; and means for securing the tubes in the fenestrations.

Another object is to provide a device of the general class described first above which comprises a sandwich structure composed of two relatively thick and generally flat sheets of transparent material, each sheet being a mirror-image of the other, with each sheet provided with a straight groove and another elongated groove the greater part of the length of which is inclined to the longitudinal axis of the straight groove, the other groove having an end portion bent toward that axis, the grooves being semicircular in cross-section so that, when the two sheets are juxtaposed in congruency with their grooved sides together the grooves constitute two tubes inside the sandwich structure; means for permanently joining the sheets together; and with liquid and an air bubble within the tube formed by the mating straight grooves (whereby tube, liquid, and bubble form a level), and with a ball in the other tube and free to roll therein.

These and other objects, features, and advantages of the invention will be more fully understood from the following detailed description and from the drawing.

All embodiments of the present invention described herein are useful both as accelerometers and as decelerometers for vehicles such as automobiles.

Figure 4:
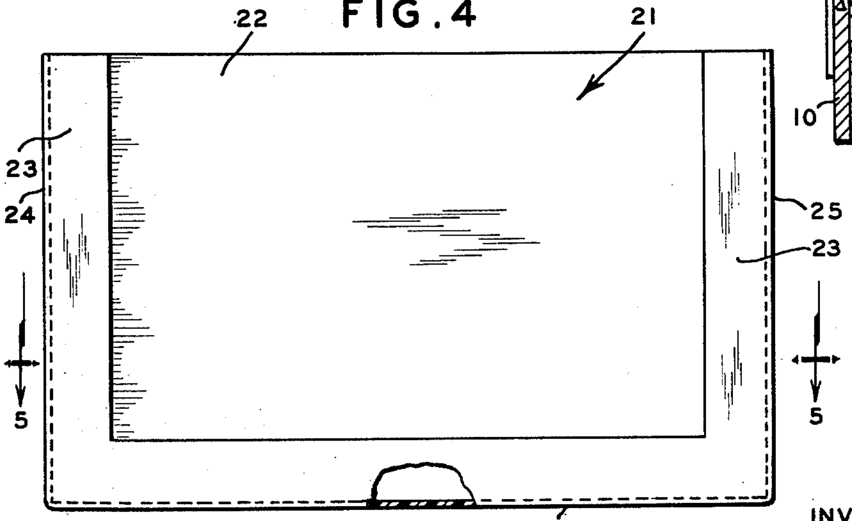
FIG. 4 is a front elevational view of a pouch for holding the embodiment of FIG. 4, and is generally illustrative of a pouch for holding any one of other embodiments described herein.
Figure 5:
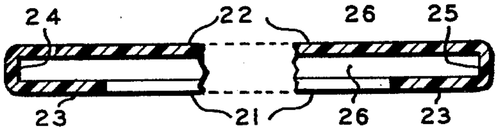
FIG. 5 is the section 5—5 of FIG. 4, condensed by breaking centrally.

Each embodiment shown in the drawing is designed to be mounted in a vertical plane with the "front" of the embodiment directed toward the driver for his easy observation, and with the plane of the embodiment parallel with the longitudinal axis of the vehicle. A particularly convenient way to mount any of the embodiments is to fix it to the window pane to the driver's left or to that to his right. Every illustrated embodiment, if mounted so as to face the driver from his right side, is operable as an accelerometer; thus, each embodiment mounted facing the driver from his left side serves as a decelerometer. The embodiment shown in FIGS. 1, 2, and 3, and its modifications described below, whether or not used in connection with a pouch such as is seen in FIGS. 4 and 5, or a functionally similar container, are adapted to be mounted only with the "front," or obverse aspect, directed toward the driver. The embodiments shown in FIGS. 6, 7, and 8, and their modifications also described below, whether or not used in connection with the above-mentioned pouch or a functionally equivalent container, are adapted to be mounted with either the obverse or the reverse aspect directed toward the driver; and these embodiments may be "read" from either side. The structure of FIGS. 1, 2, and 3, and its modifications, are accelerometers only when mounted to face the driver from his right, and decelerometers only when mounted to face the driver from his left. However, mirror-images of the structure of FIGS. 1, 2, and 3, and of its modifications, are decelerometers only when mounted to face the driver from his right, and accelerometers only when mounted to face the driver from his left. The structures of FIGS. 6, 7, and 8, and their modifications, are accelerometers and decelerometers, and "readable" as such, when their obverse sides are directed toward the driver from his right and left sides respectively; and when their reverse sides are directed toward the driver from his left and right sides respectively. For example, any of these last-described embodiments, fixed to the window pane to the driver's left, is a decelerometer when its obverse side is directed toward the driver, and an accelerometer when its reverse side is so directed. Of course, all embodiments described herein are operable only when mounted in a vertical plane, as described above, with the embodiment leveled and its top uppermost.

All embodiments of the invention described herein are adapted particularly for mounting in operable position upon the inside surface of a window pane of a vehicle. And every embodiment is provided with means—that is, a level—for checking the propriety of orientation when so mounted.

Generically, each embodiment herein described is a device for indicating the rate of change of speed of a vehicle, such as an automobile, and includes a level comprising a straightly elongated sealed transparent vessel containing liquid and a bubble of air; another elongated sealed transparent vessel, straight for the greater part of its length with that part disposed diagonally with respect to the longitudinal axis of the level and with an end portion farthest from the axis bent toward that axis, the second-described vessel containing a ball free to roll from end to end thereof; and means for rigidly holding the two vessels in fixed spatial relationship and in a common plane. The foregoing is an essential statement of the elements of the invention present in every one of the embodiments hereof.

Figure 1:
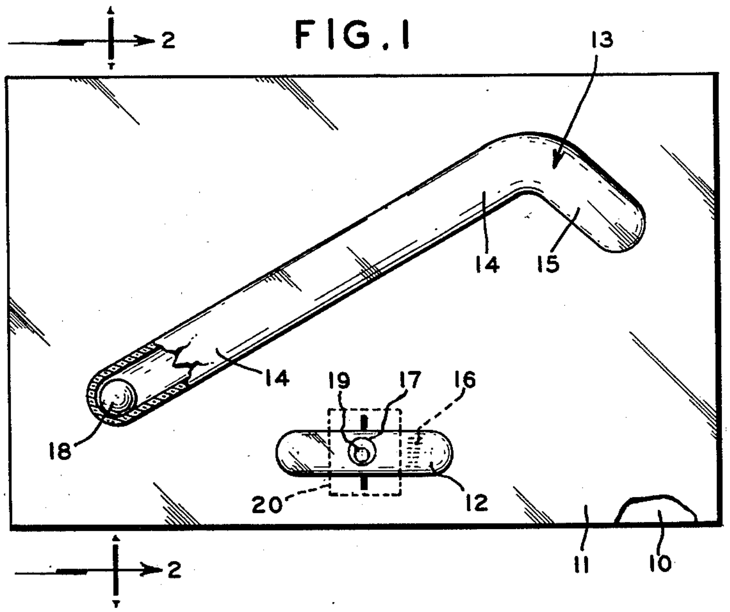
FIG. 1 is a front elevational view of one embodiment of the invention.
Figure 2:
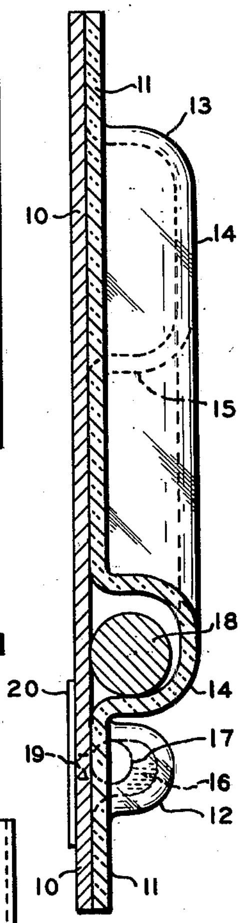
FIG. 2 is the section 2—2 of FIG. 1, at twice the scale of that figure.
Figure 3:
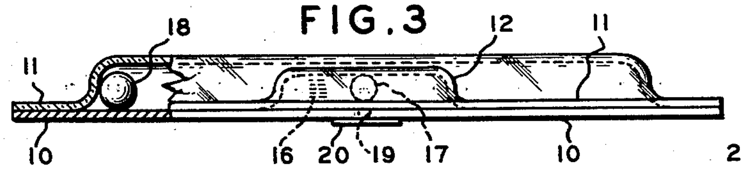
FIG. 3 is a bottom plan view of the embodiment of FIG. 1.

A first embodiment of the invention is illustrated in FIGS. 1, 2, and 3, respectively a front elevational view, an enlarged vertical section according to the index 2—2 of FIG. 1, and a bottom plan view.

This embodiment is essentially a sandwich structure, and may be made at such low cost that the device might well be part of a give-away advertising medium. The device is designed particularly for mounting upon the inside of the window pane to the driver's left for indicating deceleration, or for mounting upon the inside of the window pane to the driver's right for indicating acceleration. As shown, the device, operating as a decelerometer, is useful for signaling whether or not the diminution of speed of the vehicle takes place at an acceptable, or safe, rate upon a reasonable application of brakes. On the other hand, the device, working as an accelerometer, serves as an index of the vehicle's pick-up. The device, while itself capable of quite accurate operation, is not intended to be more than an aid to approximations of true braking and pick-up characteristics of the vehicle on account of factors—particularly human factors—which may be quite variable. See below.

The embodiment comprises a base sheet 10, here shown to be planar and rectangular, which may be made of any suitable, and preferably stiff, material, such as cardboard, or plastic; and a transparent sheet 11 of plastic, the greater part of which is planar and with that part suitably cemented to the obverse side (that shown in FIG. 1, and visible through sheet 11) of sheet 10, the sheet 11 having two portions permanently bent and forming, with sheet 10, two blisters 12 and 13, both elongated, and one (12) being straight, and the other (13) being also straight for the greater part of its length with that part, designated 14, disposed diagonally with respect to the longitudinal axis of the straight blister 12 and having an end portion 15 farthest from the above-mentioned axis bent toward that axis. The blister 12 is part of a level, and contains a liquid 16 and a bubble 17 of air, in usual manner; and the blister 13 contains a ball 18 which is free to roll from end to end of that blister. The introduction of liquid 16 into blister 12 is preferably facilitated by a small perforation 19 provided in sheet 10 and sealed, after such introduction, in any suitable manner, as by means of a patch 20—substantially a relatively small planar sheet, preferably a piece of cellophane adhesive tape. The ball 18 may, of course, be placed anywhere within that permanently bent portion of sheet 11 which forms, with sheet 10, the blister 13, and before the sheets 10 and 11 are cemented together. Looking at FIG. 1, the permanently bent portions of sheet 11 are in relief. The sheet 11, with its two elongated bent portions which form part of blisters 12 and 13 may be a plastic molding; or the sheet may be an originally planar sheet permanent, deformed in suitable manner to provide these bent portions.

The embodiment just described is suitable for application against the inside of a vehicle window pane, the reverse side of the embodiment being almost uninterruptedly planar except for the patch 20, which need, of course, have no such relative thickness as appears in the drawing principally for the purpose of clarification. The device may be attached to the pane by means of cellophane adhesive tape, or by other means. Preferably the reverse side of sheet 10 is coated, at least in part, with a pressure-sensitive adhesive, which it is inconvenient to indicate in the drawing. The level of which blister 12 is part serves to facilitate proper orientation of the embodiment.

The embodiment may also be properly positioned for its intended operation by slipping it into such a pouch, frame, or partial envelope, like that shown in FIGS. 4 and 5, the section 5—5 of FIG. 4, and designated, in its entirety, 21, and which is itself shaped for convenient mounting on a smooth vertical surface. The pouch 21 may be a plastic molding. FIG. 4 is a view of its obverse side. Its reverse side is planar (cf. FIG. 5) and may be coated at least in part with a pressure-sensitive adhesive. The pouch 21 comprises, as shown, a planar rear sheet 22 and a frontal square-U-shaped frame 23 connected to the sheet 22 by side walls 24 and 25 and a bottom wall 26. The pouch illustrated in the drawing is designed purposefully to hold the embodiment of FIGS. 1–3, but modifications of the pouch suitable for holding other embodiments of the invention are obvious. The particular advantage of pouch 21 is that the embodiment of FIGS. 1–3 need not be mounted directly on a window pane by adhesive means, and, when it is desired to tilt the embodiment, to return the ball 18 from the lower end of portion 15 of blister 13 to the lower end of portion 14 thereof, the embodiment may be taken freely from the pouch for this purpose.

FIG. 1 is a frontal view of the embodiment of FIGS. 1–3. The axis of blister 12, when the embodiment is properly mounted, is horizontal. FIG. 1 is exemplary only with respect to the shape of blister 13 and the gradient of its portion 14, and the portion 15 of blister 13 may be variously formed so long as it represents an upper end portion of the blister bent downwardly toward the axis of blister 12. The gradient of portion 14 of blister 13 is, of course, invariable with respect to the axis of the level in any single modification of the embodiment above-described. The device may be designed and built with an easy or a steep gradient for portion 14. When the vehicle is at rest or moving at a constant or nearly constant rate of speed the ball 18 remains at rest or nearly stationary at the lower end of portion 14, as shown.

If the embodiment, properly mounted, faces the driver of the vehicle from his left, the device serves as a decelerometer or a brake-testing apparatus. Any single modification of the embodiment may be marked with data, as in print preferably on sheet 10, which is visible through sheet 11, relating to a particular acceptable braking performance, including such matters as the speed at which an effort to halt the vehicle is initiated and the number of feet required and the number of seconds required for stopping the vehicle, assuming a uniform braking effort. In such modification, of course, the gradient of portion 14 will be such that acceptable braking performance causes the ball 18 to roll forward up to the top of blister 13 and to fall into portion 15 thereof.

If the embodiment, properly mounted, faces the driver of the vehicle from his right, the device serves as an accelerometer or an apparatus for testing the vehicle's pick-up. Any single modification of the embodiment may be marked, as suggested above, with data relating to a particular acceptable pick-up performance, including the number of feet and seconds required for, say, a standstill up to chosen rate of speed. In such modification the gradient of portion 14 will be such that acceptable pick-up causes the ball 18 to roll backward up to the top of blister 13 and to fall into portion 15 thereof.

It will be immediately apparent that a gradient (of portion 14) adaptable for brake-testing may ordinarily be expected to be too steep for pick-up testing; but this is not necessarily so, for the length of portion 14, and the adopted initial speed for the application of brakes and the rate of speed adopted as that sought to be attained, as from, zero, may render a single modification of the device adaptable for both brake-testing and pick-up testing.

It has already been pointed out that the embodiment may be held in proper position by means of pouch 21, and may therefore be easily removable and tiltable after a test for returning the ball 18 from portion 15 to portion 14 of blister 13.

The foregoing material applies in principle to other embodiments now to be described.

Figure 6:
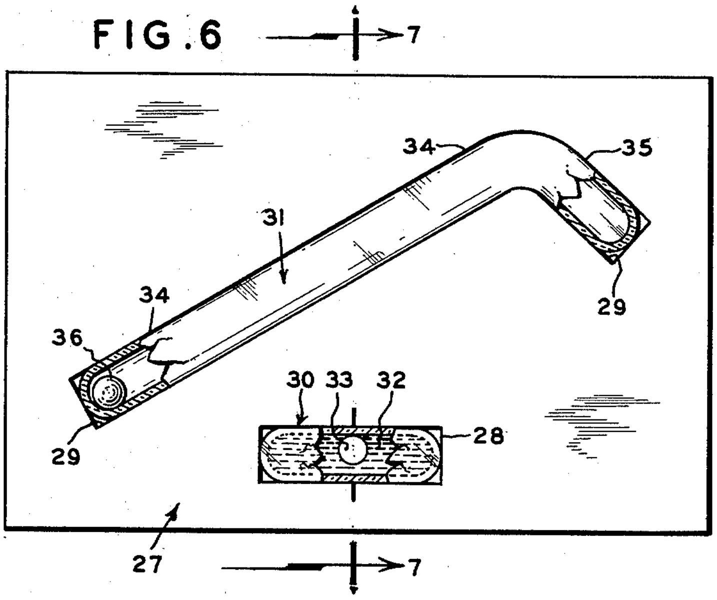
FIG. 6 is a front elevational view of another embodiment of the invention.
Figure 7:
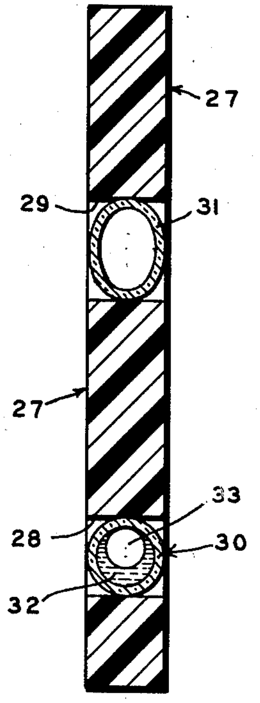
FIG. 7 is the section 7—7 of FIG. 6.

Another embodiment, subject to several close modifications, is shown in FIGS. 6 and 7, the section 7—7 of FIG. 6. This embodiment comprises, here, a rectangular thin block 27 which may be of quite inexpensive material, such as paperboard, pressboard, plastic, as desired, having a fenestration 28 therethrough in a position equivalent to that of blister 12, described above, and another fenestration 29 therethrough in a position relatively approximating that of blister 13 above; and two elongated sealed transparent tubes 30 and 31, the first-mentioned being positioned within fenestration 28, and being straight, partly filled with a liquid 32, and containing an air bubble 33, and being effectually a level, equivalent to the combination described above of which blister 12 is a part, and the second-mentioned tube being straight for the greater part 34 of its length, and having a bent end portion 35, similar to blister 13, above, and containing a ball 36 free to roll therein. In short, tubes 30 and 31 and their contents and functions are equivalent to blisters 12 and 13 and their contents and functions, respectively.

The thin block 27, which may also be described as a thick planar sheet, might conveniently be formed by die-cutting, or it could be of molded plastic. There is no advantage in transparency with respect to block 27. However, tubes 30 and 31, properly positioned and fixed respectively within fenestrations 28 and 29, may be seen from either side of the block 27; so the present embodiment may be mounted against, say, a vehicle window pane with either its obverse or reverse side in contact therewith.

This embodiment may be provided on one or both sides with a pressure-sensitive adhesive, it may be secured to a mounting surface in another manner, as suggested above with respect to the first-described embodiment, involving adhesive material, or it may be supported in proper orientation by a pouch, equivalent to 21, above. Thus this embodiment may conveniently serve as either a decelerometer, or brake-testing device, or an accelerometer, or pick-up-testing device, without respect to whether it is on the driver's left or right, depending upon whether the obverse or the reverse side faces the driver.

The tubes 30 and 31 may be fixed within their respective fenestrations 28 and 29 in any convenient manner, as by force-fitting the tubes in their fenestrations, or potting or otherwise cementing them therein. In the embodiment the cross-sections of the tubes are desired to be at least not greater than the thickness of the block 27. As shown, the cross-sections and thickness mentioned are about equal. If, of course, the latter conditions exist, the tubes may be held in their fenestrations by means of adhesive (transparent) film applied to the obverse and reverse sides of blocks 27, but, ideally, the tubes should not be able to move, even slightly, relatively to the block—the tubes may be of glass or any other suitable transparent material.

Figure 8:
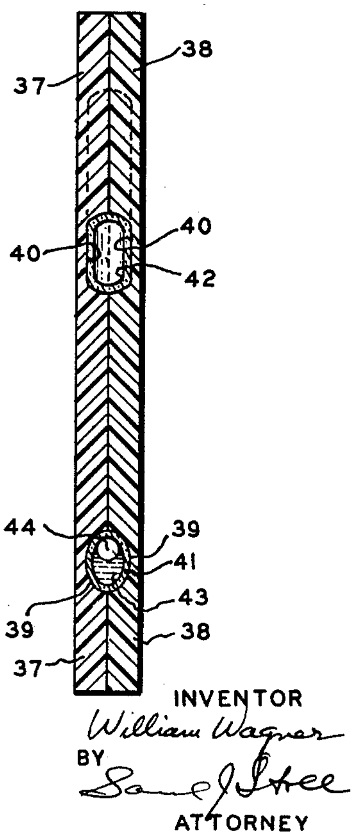
FIG. 8 is a sectional elevational view of still another embodiment of the invention, and, as a figure, is a centric section like FIG. 7.

Another embodiment of the invention is shown only in centric vertical section in the drawing (in FIG. 8, a figure characteristic of FIG. 7). This embodiment is functionally the equivalent of the embodiment of FIGS. 6 and 7, and its obverse and reverse aspects may be assumed to be much like the embodiment of the last two figures. The embodiment of FIG. 8 is a sandwich structure which may be composed of two relatively thick flat sheets 37 and 38 of transparent plastic, each of which is a mirror-image of the other. Each is formed, as by molding, so as to have a relatively short straight groove 39 and an elongated groove 40 the greater portion of which is straight and diagonally disposed to the longitudinal axis of groove 39, groove 40 having a bent end portion like portion 15 of blister 13, FIG. 1. These unindexed portions of grooves 40 are analogously illustrated in FIG. 1 (portions 14 and 15) and FIG. 6 (portions 34 and 35). The cross-section of either a groove 39 or a groove 40 is preferably semi-circular. When the two sheets 37 and 38 are placed in juxtaposition and in congruency, with their grooved sides together, and permanently attached to each other, as by an adhesive, a transparent block with two sealed elongated tubes 41 and 42 inside thereof results.

In any suitable manner tube 41 is partially filled with a liquid 43 so that an air bubble 44 remains, and the tube, liquid, and bubble constitute a level. Introduction of liquid into tube 41 would appear to be most conveniently effected after the sheets 37 and 38 are fixed together; a small hole may be bored in one of the sheets and sealed after such introduction. A ball, functionally equivalent to balls 18 and 36, free to roll in tube 42, is not illustrated, but is assumed to be present in the tube when the latter is completed. Either or both sides of this embodiment may be provided with pressure-sensitive adhesive.

It is not necessary to describe the functions of the embodiments of FIGS. 6 and 7 and of FIG. 8, as reference may be had to the detailed description, above, of the functions of the first-described embodiment. Of course the embodiment of FIG. 8 may be carried in a pouch similar to pouch 21.

The embodiments of FIGS. 6 and 7, and of FIG. 8, have the special features of being "readable" from either side, of being mounted with the obverse or the reverse side directed toward the driver of the vehicle, and of serving as an accelerometer or a decelerometer either to the left or the right of the driver.

Thus, it will be seen that this invention provides an article which may be easily mounted on the window pane of an automobile or truck to the side of the driver for his use as an accelerometer or pick-up-testing device or as a decelerometer or brake-testing device, and which, while capable of extremely accurate operation, can be so inexpensively manufactured that it may be prudently distributed as an advertising give-away.

I claim:

In a device for indicating acceleration or deceleration of a motor vehicle, a laminated structure comprising a support sheet, coated at least in part on one side with a pressure-sensitive adhesive for mounting on a side window or other part of a motor vehicle which occupies a generally vertical plane generally parallel with the longitudinal axis of the vehicle, a transparent plastic sheet having a pair of blisters formed therein, said plastic sheet being adhesively secured to the opposite side of said supporting sheet, said blisters being open to said supporting sheet and forming a pair of enclosures therewith, one of said blisters defining an elongated tube, the other blister defining a relatively short tube, the longitudinal axis of said short tube extending horizontally and containing level-indicating means, said elongated tube being disposed diagonally with respect to said relatively short tube, one end of the elongated tube being at a higher level than the opposite end thereof, said higher end having a portion bent horizontally therefrom, and a freely movable ball mounted in said elongated tube.

References Cited in the file of this patent

UNITED STATES PATENTS

| | | |
|---|---|---|
| 1,842,384 | Blanchard | Jan. 26, 1932 |
| 2,119,145 | Zadig | May 31, 1938 |
| 2,340,521 | Engert | Feb. 1, 1944 |

FOREIGN PATENTS

| | | |
|---|---|---|
| 180,845 | Switzerland | Feb. 1, 1936 |
| 186,708 | Switzerland | Dec. 16, 1936 |